G. W. BINGHAM.
MOVING PICTURE MACHINE.
APPLICATION FILED JAN. 11, 1915.
1,156,457.
Patented Oct. 12, 1915.
4 SHEETS—SHEET 1.
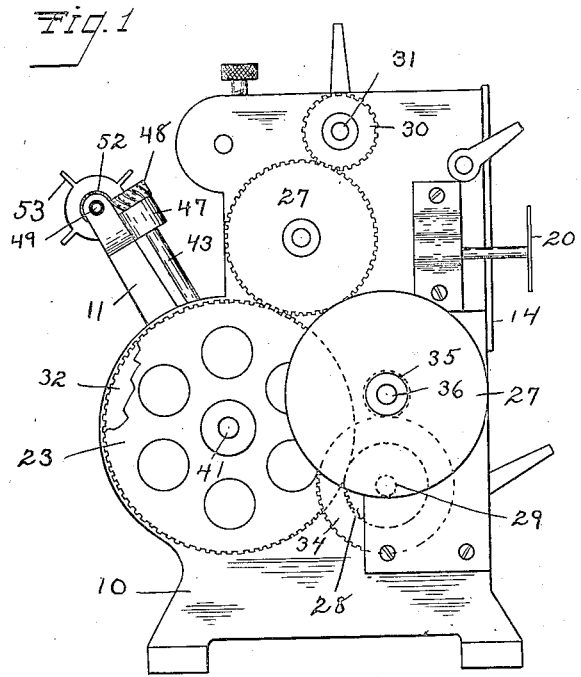
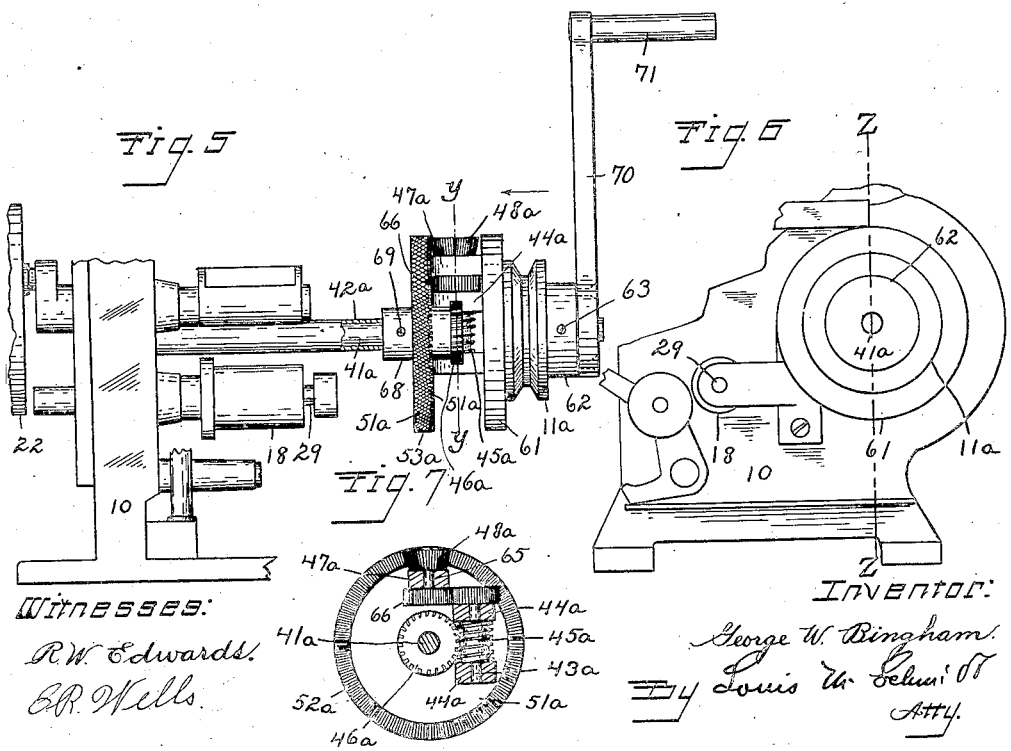
Witnesses:
R. W. Edwards.
E. R. Wells.
Inventor:
George W. Bingham G. W. BINGHAM.
MOVING PICTURE MACHINE.
APPLICATION FILED JAN. 11, 1915.
1,156,457.
Patented Oct. 12, 1915.
4 SHEETS—SHEET 2.
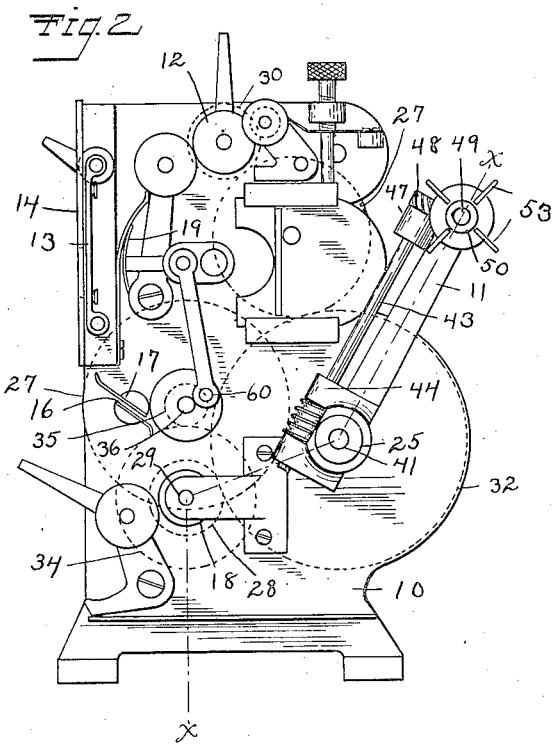
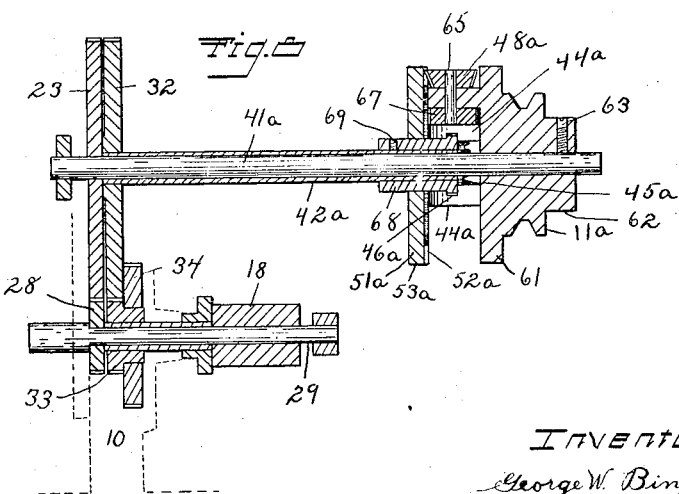
Witnesses:
R. W. Edwards
C. R. Wells
Inventor:
George W. Bingham
By Louis M. Schmidt
Atty.

G. W. BINGHAM.
MOVING PICTURE MACHINE.
APPLICATION FILED JAN. 11, 1915.
1,156,457.
Patented Oct. 12, 1915.
4 SHEETS—SHEET 3.
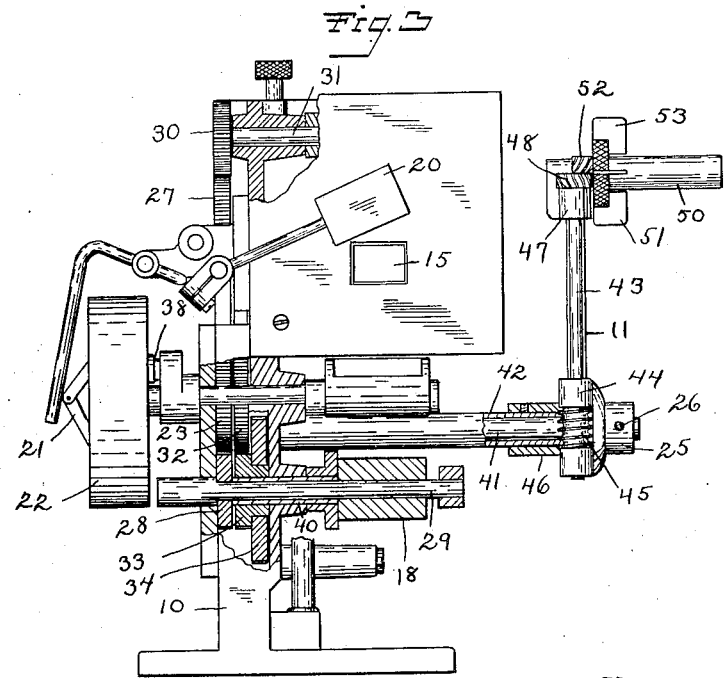
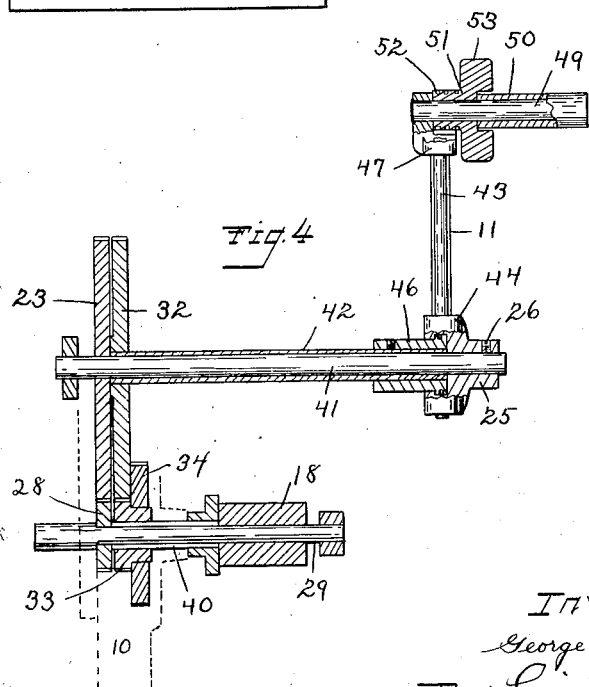
Witnesses:
R. W. Edwards.
C. R. Wells.
Inventor:
George W. Bingham.
By Louis W. Schmidt
Atty.

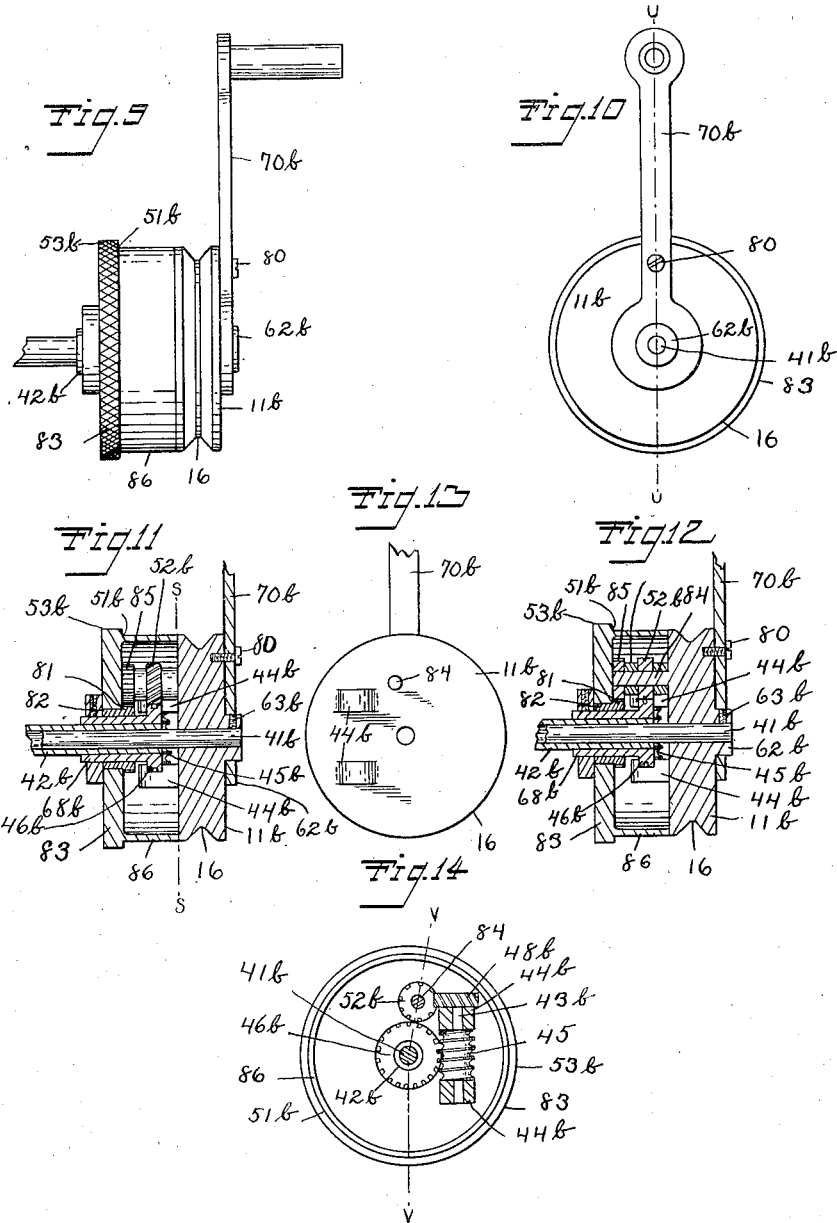

UNITED STATES PATENT OFFICE.

GEORGE W. BINGHAM, OF NEW BRITAIN, CONNECTICUT.

MOVING-PICTURE MACHINE.

1,156,457.   Specification of Letters Patent.   Patented Oct. 12, 1915.

Application filed January 11, 1915. Serial No. 1,685.

*To all whom it may concern:*

Be it known that I, GEORGE W. BINGHAM, a citizen of the United States, residing at New Britain, in the county of Hartford and State of Connecticut, have invented certain new and useful Improvements in Moving-Picture Machines, of which the following is a specification.

My invention relates to improvements in moving picture machines, and has particular reference to means for framing the picture while in operation, and the object of my improvement is simplicity and economy in construction and convenience and efficiency in use.

In the accompanying drawing, Figure 1 is a side elevation of my improved moving picture machine, showing the left side. Fig. 2 is an elevation of the right side. Fig. 3 is a rear elevation of the same. Fig. 4 is a sectional view on the line $x$ $x$ of Fig. 2, the frame being omitted. Fig. 5 is a rear elevation, in part broken away, of a modification of my machine, adapted to be operated by power. Fig. 6 is an end elevation of the same. Fig. 7 is a sectional view on the line $y$ $y$ of Fig. 5. Fig. 8 is a sectional view on the line $z$ $z$ of Fig. 6. Fig. 9 is a rear elevation of part of a modification of my machine. Fig. 10 is a side elevation of the same. Fig. 11 is a sectional view on the line $u$ $u$ of Fig. 10. Fig. 12 is a sectional view on the line $v$ $v$ of Fig. 14. Fig. 13 is a view of the pulley from the inner side, and adjacent parts. Fig. 14 is a sectional view on the line $s$ $s$ of Fig. 11.

The machine shown in Figs. 1, 2 and 3 is a hand operated machine, comprising a frame 10 in which is mounted the operating mechanism which is operated by the crank 11.

Referring to Fig. 2, the film passes around the lower portion of the upper sprocket wheel 12, forming a loop at the upper part of the machine, and downwardly between the guide 13 and the opposed front wall portion 14 of the frame 10, across the aperture 15, downwardly and rearwardly through the aperture 16 in the oscillating device 17, thence over a portion of the lower sprocket wheel 18, and out through the lower part of the machine. A shutter 19 controls the exposure through the aperture during normal conditions of operation. An emergency shutter or blind 20 operated by a governor like device 21 incorporated with the balance wheel 22 closes the aperture 15 when the operation of the machine is interrupted. The main sprocket gear 23 drives the sprocket wheels 12 and 18, being engaged directly with the gear 28 on the shaft 29 on which the lower sprocket wheel 18 is mounted and indirectly with the gear 30 on the shaft 31 on which the upper sprocket wheel 12 is mounted through the medium of the intermediate gear 27. The main driving gear 32 drives the operative features mentioned other than the sprocket wheels through suitable interconnecting gearing and mechanism. The intermediate connecting means between the said gear 32 and the said mechanism is the gear 33, with which it meshes. The gear 34 adjacent and fixed to the gear 33 engages with the gear 35 on the shaft 36 on which the balance wheel 22 is mounted. Incorporated with the balance wheel 22 is a cam having a groove in which a projection on the arm 38 travels suitably to impart an oscillating movement to the oscillating device 17. The shutter 19 is operated by a link 39, connected to the crank 60, mounted on the same shaft 36 on which the balance wheel 22 is mounted. The combined gear 33 and 34 serves as a transmission device for transmitting the power applied to the main driving gear 32 to the parts that are moved by the said main driving gear 32, and the same is mounted on a sleeve 40 that incloses the shaft 29 on which the lower sprocket wheel 18 is mounted.

The main driving shaft is composed of two portions, respectively an inner portion 41, on one end of which the crank 11 is directly mounted by means of a hub 25 and a set screw 26, and on the other end of which the main sprocket gear 23 is mounted, and, intermediate the said ends, a sleeve portion 42 outside the same. The main driving gear 32 is mounted on one end of the sleeve portion 42, adjacent the main sprocket gear 23.

The crank 11 is connected indirectly to the sleeve portion 42 in the following manner: On the hub 25 are provided bearings 44 for a counter shaft 43, extending parallel to the crank 11 and along one face of the same the bearings 44 being suitably spaced to receive between them the worm 45 on the said counter-shaft 43. On the sleeve portion 42 is mounted a worm gear 46 that meshes with the worm 45. A suitable guide bearing 47 is provided adjacent the outer end of the crank 11 for the outer end of the counter shaft 43. At the said outer end of the counter shaft 43 there is a spiral gear 48. At the outer end of the crank 11 there is a laterally directed handle supporting pin 49 on the outer portion of which there is provided a loosely mounted handle sleeve 50. At the inner end of the handle pin 49 is a member 51 comprising at the inner side a spiral gear 52 coöperating with the spiral gear 48 on the counter shaft 43 and which is provided with a plurality of radially directed wings 53, suitable to serve as thumb pieces for being engaged with the thumb of the handle engaged with the handle sleeve 50.

Under normal conditions the worm 45 serves as locking means for locking the sleeve portion 42 and the inner portion 41 together so that these portions will be operated as a unit by means of the crank 11. Under such normal conditions the thumb piece or wings 53 are disengaged or free, and the member 51 of which these are a part is locked on the handle pin 49. Under such normal conditions the film is properly framed with reference to the aperture. In case however the framing is not correct, then in order to bring the film and aperture in proper relation I change the relative movement of the film moving mechanism, operated by the main sprocket gear 23, and the other moving mechanism, operated by the main driving gear 32, this change being maintained until the proper framing conditions are effected, and then the normal conditions are resumed, and the change described is effected by interrupting the normal relation of the member 51. The operator may effect this in a simple manner by engaging the thumb with one of the thumb pieces 53, while continuing the operation in every other respect as usual, and without requiring any other attention than watching the result on the screen. The effect of thus engaging with the thumb piece 53 is to turn the counter shaft 43 and worm 45, and through the worm 45 and worm gear 46 to turn the sleeve portion 42 on the inner portion 41. As the main sprocket gear 23 is mounted on the inner portion 41 and the main driving gear 32 on the outer sleeve portion 42, the said gears will be moved relatively the one to the other, instead of being moved as a unit by an essentially unitary shaft as under normal conditions. The individual movements of the main sprocket gears 23 and the main driving gear 32 are transmitted to the film and to the other operative mechanism by means of the connecting gearing that has been described. Accordingly, the framing is effected by the simple operation of braking the member 51 so that the same will be held against any rotation whatsoever. As the crank is continued in rotation, as in the case of the handle sleeve 50, which is grasped by the hand, there is a rotative effect of the handle pin 49 within the member 51, as within the handle sleeve 50, there being one complete relative rotative movement for each revolution of the crank 11. That is to say, as the member 51 is held against rotation under normal conditions, as it swings around through space there is normally a complete revolution thereof for each revolution of the crank, as there is of the handle pin 49. When this revolution is interrupted, with the continued movement of the parts through space, there is actually effected a revolution of the member 51 relatively to the handle pin 49, just as there would be if the member 51 were turned on the handle pin 49 with the said pin stationary. The result of this turning movement of the member 51 is imparted to the counter-shaft 43 through the medium of the spiral gears 52 and 48, and through the counter-shaft 43 and worm 45 to the outer sleeve portion 42.

It is understood that the film sprocket wheels 12 and 18 may be replaced by other film engaging means suitable for engaging with the film and effecting the movement thereof responsive to the main propelling means, as other forms of film moving wheels or rolls may be employed for this purpose. Also other changes in details may be made without departing from the spirit of my invention.

The machine heretofore described is a hand operated machine. In order to use my invention with a power driven machine certain changes are made as shown in Figs. 5, 6, 7, and 8. In this machine the crank 11 is replaced by a pulley 11$^a$, having a groove for a belt, secured to the inner shaft 41$^a$. The worm 45$^a$ and the worm gear 46$^a$ are in themselves essentially the same, but the method of mounting them, particularly the worm 45$^a$, is quite different, and will be described. The counter-shaft 43$^a$ on which the worm 45$^a$ is mounted is quite short, is mounted in bearings 44$^a$ that extend inwardly from the face of a disk 61 which is preferably as shown integral with the belt pulley 11$^a$, although these parts may be made separate. One end of the counter-shaft 43$^a$ extends beyond the bearing 44$^a$ and has mounted thereon a spur gear wheel 64 instead of the spiral gear 48. The said spiral gear 48 is replaced virtually by the bevel gear 48$^a$, and is mounted on the small counter-shaft 65 and is operatively connected to the counter-shaft 43$^a$ through the medium of the spur gear 64 mounted thereon and the coöperating spur gear 66 on the small counter shaft 65. The small counter-shaft 65 has the spur gear 66 at the lower end and the bevel gear 48$^a$ at the upper end and between the said ends is engaged with the bearing 47ª. The said bearing 47ª is integral with the pulley 11ª, and which replaces the bearing 47.

The body portion of the member 51ª is of disk-like form and is mounted on the inwardly directed hub 68 of the worm gear 46ª, the said hub being secured to the outer sleeve portion 42ª by means of the set screw 69. The periphery 53ª of the said body portion is knurled, suitably to be grasped by the hand or fingers, and in operation replaces the thumb-engaging wings 53. On the inner face of the body portion of the member 51ª, adjacent the periphery, is a set of teeth 52ª, which coöperate with the bevel gear 48ª and which replace the spiral gear 52.

In operation, under normal conditions, the member 51ª is rotated as the pulley 11ª is operated by the belt, the inner shaft portion 41ª and the outer shaft portion 42ª being locked by the worm 45ª and the worm gear 46ª. When it is desired to change the framing of the film relatively to the aperture the knurled periphery 53ª is grasped and held against rotation for a suitable period, until the proper framing conditions are obtained, after which the hold is released.

It is obvious that a crank 70 may be secured on the outer face of the driving periphery 11ª in any desired manner so that the operation may be effected by hand instead of by a belt. The said crank 70 will in this case be an ordinary crank with a handle 71.

In the modification shown in Fig. 9 mechanism is shown suitable for permitting driving either by belt or by hand, comprising a pulley 11ᵇ for the belt, mounted on the inner shaft 41ᵇ by means of the hub portion 62ᵇ and set-screw 63ᵇ, and on the outer face of which is mounted the crank 70ᵇ, secured by the screw 80. The worm 45ᵇ is mounted on the worm shaft 43ᵇ, operating in bearings 44ᵇ provided on the inner face of the belt wheel 11ᵇ. On one end of the worm shaft 43ᵇ, which extends beyond one of the bearings 44ᵇ is a spiral gear 48ᵇ. The coöperating spiral gear 52ᵇ is mounted on the shaft 84, which extends inwardly, horizontally, from the inner face of the belt wheel 16. On the inner end of the shaft 84 is a spur gear 85 that meshes with the spur gear 81 to be described. On the sleeve or outer shaft 42ᵇ is mounted the worm gear 46ᵇ by means of the hub 68ᵇ, which extends appreciably inwardly. On the hub 68ᵇ is rotatively mounted the spur gear 81 already mentioned, and which has an inwardly directed hub portion 82. On the hub portion 82 is rigidly mounted the disk-like body portion 83 of the member 51ᵇ, which member serves as the controlling member, having the periphery 53ᵇ knurled, suitably to be grasped by the fingers of the operator. The member 51ᵇ is provided with a cylindrical, shell-like sleeve 86 that extends outwardly from the outer face of the disk-like body portion 83 and incloses the worm 46ᵇ and the gearing described operatively connected thereto, suitably to serve as a housing therefor. Under normal conditions the inner and outer shaft members 41ᵇ and 42ᵇ are locked by the worm 45ᵇ and worm gear 46ᵇ as in the other styles of apparatus, and which corresponds to proper framing conditions. When it is desired to change the framing conditions, the apparatus being driven by the belt wheel or crank, the member 51ᵇ is grasped by the operator, and held against rotation, and the desired change is effected by effecting a relative movement of the inner and outer shaft members.

I claim as my invention:—

1. In a moving picture machine, a set of film moving wheels, a main sprocket gear inter-connecting the said wheels, a balance wheel and mechanism connected thereto, a main driving gear operatively connected to the said balance wheel, a shaft member comprising an inner portion and a sleeve portion inclosing the same, the said main sprocket gear mounted on the inner portion, the said main driving gear mounted on the said sleeve portion, moving means for rotating the said inner portion, means inter-connecting the said sleeve portion and moving means permitting alternatively synchronous and differential movement of the said inner portion and sleeve portion, and the said last named means comprising a worm gear mounted on the said sleeve portion and a worm mounted on the inner portion.

2. In a moving picture machine, a set of film moving wheels, a main sprocket gear inter-connecting the said wheels, a balance wheel and mechanism connected thereto, a main driving gear operatively connected to the said balance wheel, a shaft member comprising an inner portion and a sleeve portion inclosing the same, the said main sprocket gear mounted on the inner portion, the said main driving gear mounted on the said sleeve portion, moving means for rotating the said inner portion, means inter-connecting the said sleeve portion and moving means permitting alternatively synchronous and differential movement of the said inner portion and sleeve portion, the said last named means comprising a worm gear mounted on the said sleeve portion and a worm mounted on the inner portion, and means for rotating the said worm on its axis responsive to movement of the said moving means.

3. In a moving picture machine, a set of film moving wheels, a main sprocket gear inter-connecting the said wheels, a balance wheel and mechanism connected thereto, a main driving gear operatively connected to the said balance wheel, a shaft member comprising an inner portion and a sleeve portion inclosing the same, the said main sprocket gear mounted on the inner portion, the said main driving gear mounted on the said sleeve portion, moving means for rotating the said inner portion, means inter-connecting the said sleeve portion and moving means permitting alternatively synchronous and differential movement of the said inner portion and sleeve portion comprising a worm and means permitting of coupling the said worm to the said moving means.

4. In a moving picture machine, a set of film moving wheels, a main sprocket gear inter-connecting the said wheels, a balance wheel and mechanism connected thereto, a main driving gear operatively connected to the said balance wheel, a shaft member comprising an inner portion and a sleeve portion inclosing the same, the said main sprocket gear mounted on the inner portion, the said main driving gear mounted on the said sleeve portion, moving means for rotating the said inner portion, a worm gear on the said sleeve portion, a worm mounted on the said inner portion, and means for rotating the said worm on its axis responsive to movement of the said moving means.

5. In a moving picture machine, film moving means, shutter operating mechanism, a shaft composed of a pair of shaft members comprising an inner shaft member and an outer sleeve member, the said film moving means being connected to one of the said shaft members and the said shutter operating mechanism being connected to the other of the said shaft members, and a worm and worm gear serving as means for operatively connecting the said shaft members.

6. In a moving picture machine, a main shaft member comprising an inner and an outer portion, a film sprocket wheel mounted on a second shaft, gearing connecting the said inner portion and second shaft, mechanism operatively connected to the said outer portion and a worm normally locking the said inner and outer portions.

7. In a moving picture machine, a shaft member comprising an inner and an outer portion, separate mechanism connected to each of the said portions, moving means for imparting a rotative movement to the said inner portion, means operative normally to lock the said inner and outer portions and permitting of operatively connecting the said outer portion to the said moving means comprising a worm gear on the said outer portion and a worm coöperating therewith and operatively mounted on the said inner member.

8. In a moving picture machine, a main shaft member comprising an inner and an outer portion, mechanism connected to each of the said portions, moving means connected to the said inner portion, a worm gear on the said outer portion, a worm operatively mounted on the said inner member, the said worm being mounted on a shaft, the said shaft having a generally radial extension, relatively to the said main shaft member, a gear mounted on the said extension, and a gear member rotatively mounted and operatively engaged with the said gear.

9. In a moving picture machine film moving means, operative mechanism other than the said film moving means, means for simultaneously moving the said means and mechanism, and means for changing the relative movement thereof comprising a worm and worm gear serving alternatively as locking means and a differential moving means.

GEORGE W. BINGHAM.

Witnesses:
JOHN E. LAMB,
ROGER W. EDWARDS.